(12) United States Patent
Sakaki

(10) Patent No.: US 11,317,023 B2
(45) Date of Patent: Apr. 26, 2022

(54) TERMINAL APPARATUS THAT SAVES POWER BY DETECTING USER OPERATION, POWER SUPPLY CONTROL METHOD THEREFOR, AND STORAGE MEDIUM

(71) Applicant: CANON KABUSHIKI KAISHA, Tokyo (JP)

(72) Inventor: Hiroki Sakaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/952,293

(22) Filed: Nov. 19, 2020

(65) Prior Publication Data
US 2021/0195114 A1    Jun. 24, 2021

(30) Foreign Application Priority Data
Dec. 20, 2019  (JP) .............................. JP2019-230646

(51) Int. Cl.
| H04N 5/232 | (2006.01) |
| G06F 1/3296 | (2019.01) |
| G06F 3/01 | (2006.01) |
| G06F 1/3231 | (2019.01) |

(52) U.S. Cl.
CPC ..... H04N 5/232411 (2018.08); G06F 1/3231 (2013.01); G06F 1/3296 (2013.01); G06F 3/011 (2013.01); G06F 3/017 (2013.01)

(58) Field of Classification Search
CPC . H04N 5/232411; G06F 1/3296; G06F 3/011; G06F 1/3231; G06F 3/017
See application file for complete search history.

(56) References Cited

U.S. PATENT DOCUMENTS

| 9,215,371 | B2 | 12/2015 | Nakano |
| 2013/0124737 | A1* | 5/2013 | Tachibana ................ H04N 1/00 709/227 |
| 2021/0165495 | A1* | 6/2021 | Kawakami .............. G06F 13/00 |

FOREIGN PATENT DOCUMENTS

JP    2012165243 A    8/2012

* cited by examiner

*Primary Examiner* — Andrey Belousov
(74) *Attorney, Agent, or Firm* — Rossi, Kimms & McDowell LLP

(57) ABSTRACT

A terminal apparatus which improves power saving efficiency and prevents the terminal apparatus from going into a power saving mode by mistake. The terminal apparatus is capable of being swung down by user's hands. Motions in directions of three axes of the terminal apparatus are detected, and acceleration output values in the directions of the three axes are output as the detected motions. Based on the acceleration output values, it is determined whether the terminal apparatus was swung down at the end of use or during use. Based on a result of the determination, the terminal apparatus is switched to the power saving mode.

10 Claims, 12 Drawing Sheets

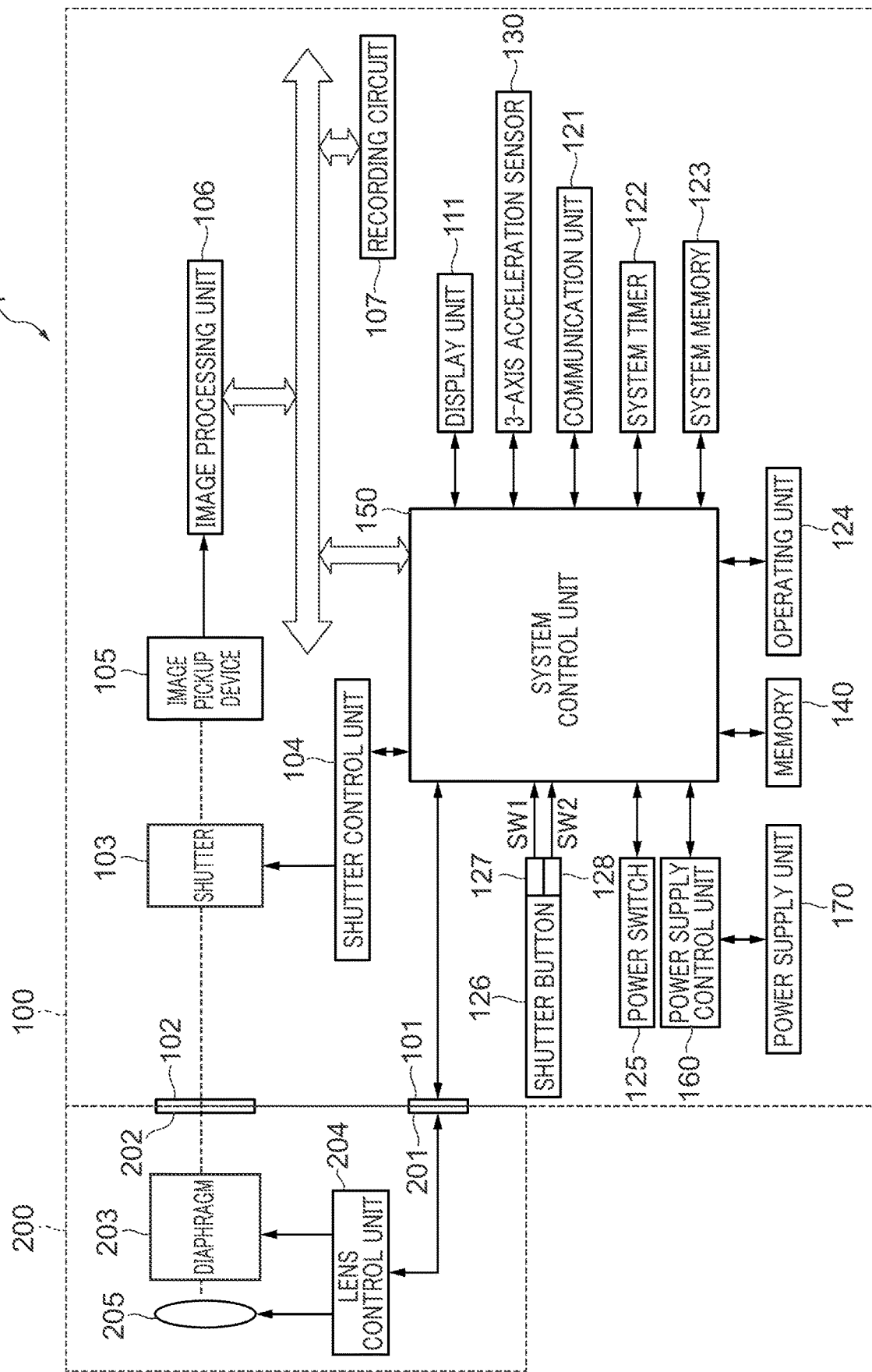

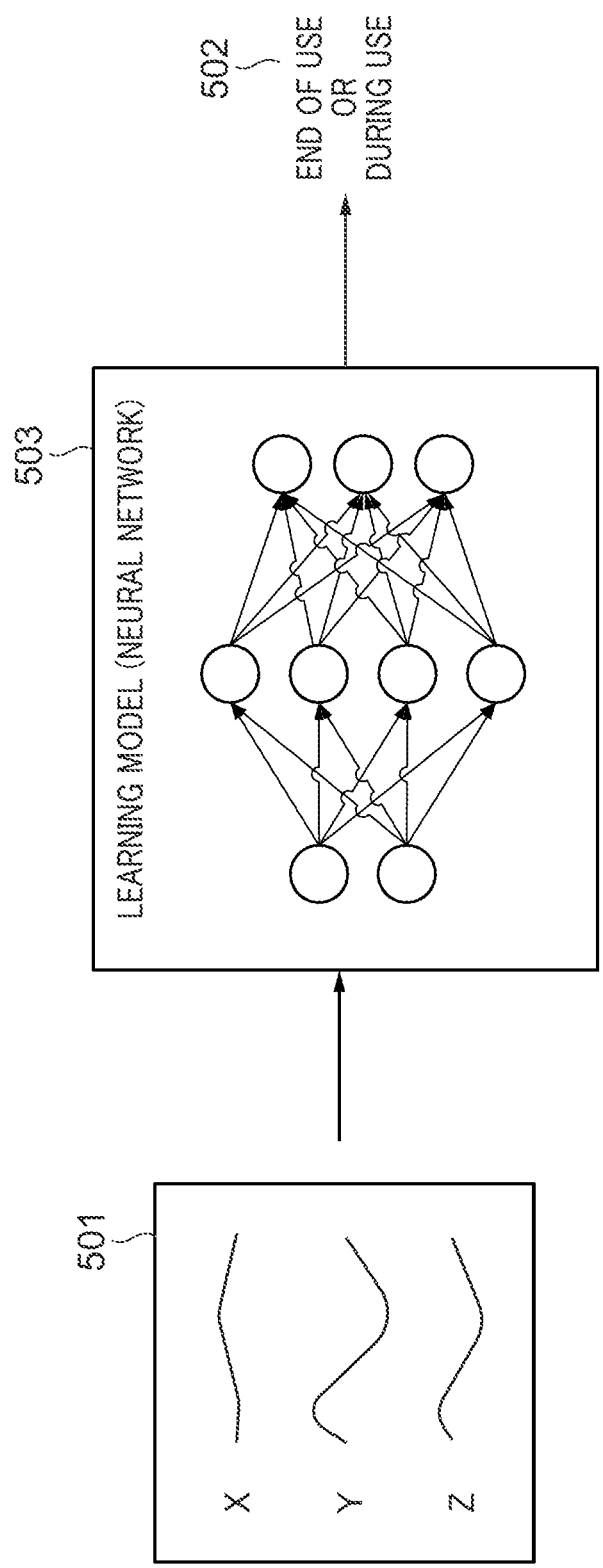

TERMINAL APPARATUS THAT SAVES POWER BY DETECTING USER OPERATION, POWER SUPPLY CONTROL METHOD THEREFOR, AND STORAGE MEDIUM

BACKGROUND OF THE INVENTION

Field of the Invention

The present invention relates to a terminal apparatus, a power supply control method, and a storage medium, and in particular to terminal apparatus which saves power by detecting user operation and a power supply control method therefor and a storage medium.

Description of the Related Art

Conventionally, a camera equipped with a function of going into a power saving mode when there has been no operation by a user for a predetermined time period is known.

There may be cases where the power to the camera is on even if there has been no operation by the user, for example, when the user is looking for a subject. In such cases, the camera switches to the power saving mode because of the above function to reduce power consumption and improve battery life.

On the other hand, the time when the user finishes using the camera cannot be reliably found with the above function, and hence a problem that the camera unexpectedly switches to the power saving mode or a problem that it takes long for the camera to switch to the power saving mode arises.

To solve this problem, Japanese Laid-Open Patent Publication (Kokai) No. 2012-165243 discloses a technique that accumulates posture information in a buffer, determines whether or not an image pickup apparatus has moved based on the accumulated posture information, and according to a result of the determination, switches to the power saving mode.

However, according to the technique disclosed in Japanese Laid-Open Patent Publication (Kokai) No. 2012-165243, a large amount of power is consumed since the posture information continues to be successively accumulated in the buffer. Moreover, if the image pickup apparatus is switched to the power saving mode based merely on whether or not the image pickup apparatus has moved as described in Japanese Laid-Open Patent Publication (Kokai) No. 2012-165243, a problem that the image pickup apparatus switches to the power saving mode when the user is still using the image pickup apparatus may arise. This problem applies to all types of terminal apparatuses whose motion (posture) is changed by user's hands.

SUMMARY OF THE INVENTION

The present invention provides a terminal apparatus which improves power saving efficiency and prevents the terminal apparatus from going into a power saving mode by mistake when it is being used as well as a power supply control method therefor and a storage medium.

In a first aspect of the present invention, there is provided a terminal apparatus capable of being swung down by user's hands, comprising a motion detection unit configured to detect motions in directions of three axes of the terminal apparatus and output acceleration output values in the directions of the three axes as the detected motions, a determination unit configured to, based on the acceleration output values from the motion detection unit, determine whether the terminal apparatus was swung down at the end of use or during use, and a power saving unit configured to, based on a result of the determination, switch the terminal apparatus to a power saving mode.

According to the present invention, power saving efficiency is improved, and the terminal apparatus is prevented from going into the power saving mode by mistake when it is being used.

Further features of the present invention will become apparent from the following description of exemplary embodiments (with reference to the attached drawings).

BRIEF DESCRIPTION OF THE DRAWINGS

FIG. 1 is a block diagram showing an arrangement of an image pickup apparatus which is a terminal apparatus according to a first embodiment of the present invention.

FIG. 5 is a view useful in explaining data input to and output from a learning model constructed by a learning unit in FIG. 2B according to a second embodiment.

DESCRIPTION OF THE EMBODIMENTS

Figure 2A:
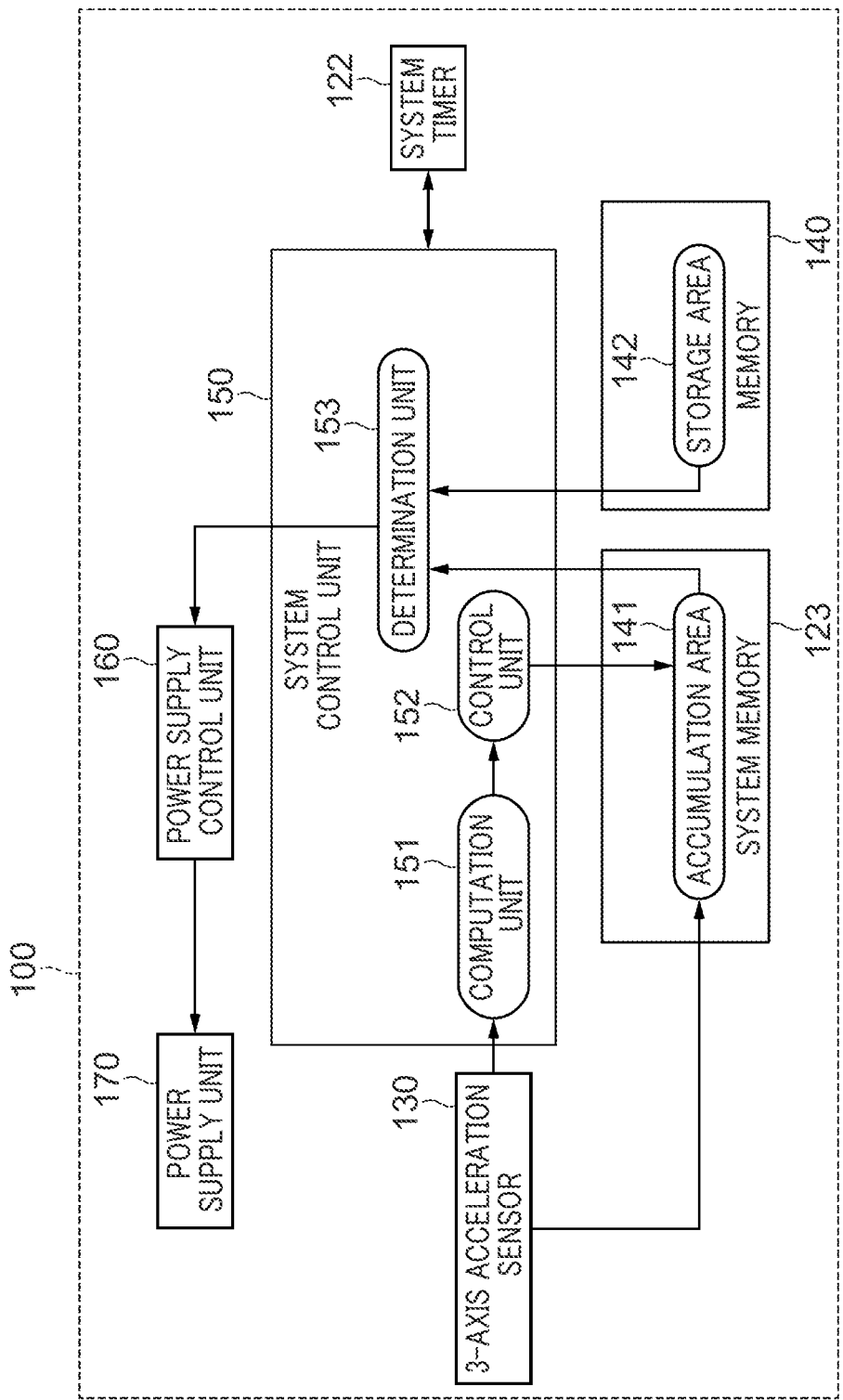
FIG. 2A is a block diagram showing in detail arrangements of a system control unit, a system memory, and a memory in FIG. 1.

The present invention will now be described in detail below with reference to the accompanying drawings showing embodiments thereof.

The embodiments described below do not limit the present invention related to the scope of claim for patent, and all of combinations of features of the embodiments described below are not always absolute necessities for solving problems of the present invention.

FIG. 1 is a block diagram showing an arrangement of a lens unit interchangeable image pickup apparatus (hereafter referred to merely as "the image pickup apparatus") 1 which is a terminal apparatus according to a first embodiment of the present invention.

Referring to FIG. 1, the image pickup apparatus 1 is comprised of a camera main body 100, and a lens unit 200, which is configured to be removable from the camera main body 100. Namely, the lens unit 200 guides incident light to an image pickup device 105 of the camera main body 100.

First, a description will be given of an arrangement of the camera main body 100.

The camera main body 100 has a connector 101, a lens mount 102, a shutter 103, a shutter control unit 104, the image pickup device 105, an image processing unit 106, a recording circuit 107, a display unit 111, and a communication unit 121. The camera main body 100 also has a system timer 122, a system memory 123, an operating unit 124, a power switch 125, a shutter button 126, a first shutter switch 127, a second shutter switch 128, and a 3-axis acceleration sensor 130. The camera main body 100 also has a memory 140, a system control unit 150, a power supply control unit 160, and a power supply unit 170.

Based on exposure information from the image processing unit 106, the shutter control unit 104 controls the shutter 103 in conjunction with a lens control unit 204 which controls a diaphragm 203 of the lens unit 200, to be described later.

In the image pickup device 105, incident light that has passed through a lens 205, the diaphragm 203, and a lens mount 202 in the lens unit 200, to be described later, and also passed through the lens mount 102 and the shutter 103 in the camera main body 100 forms an optical image of a subject. The image pickup device 105 converts the formed optical image of the subject into an electric signal (image signal) and outputs it to the image processing unit 106.

The image processing unit 106 performs a predetermined computation on the image signal output from the image pickup device 105, and based on a result of the computation, subjects the image signal to image processing such as pixel interpolation, color conversion, and white balance and outputs a resulting signal as a picked-up image or a through image to the display unit 111. The image processing unit 106 also has a function of compressing the image signal into image data in such formats as JPEG.

The recording circuit 107 is removable from a recording medium, not shown, such as a semiconductor memory, where image data can be written to and read from, and reads and writes image data from and to the attached recording medium.

The communication unit 121 is connected to an external apparatus wirelessly or via a wired cable and transmits or receives image signals and audio signals. The communication unit 121 is also connectable to a wireless LAN (local area network) and the Internet. The communication unit 121 is capable of transmitting data on picked-up images (or through images) and image data recorded on the recording medium via the recording circuit 107 and also capable of receiving image data and various types of other information from the external apparatus.

The operating unit 124 is an operating means for a user to input various types of predetermined operating instructions to the system control unit 150. Specifically, the operating unit 124 is comprised of one or a combination of a switch, dial, touch panel, pointing using line-of-sight detection, and voice recognition device.

The system timer 122 measures elapsed time for use in various types of control and time elapsed in a built-in clock.

A RAM is used as the system memory 123. Constants, variables, programs read out from the memory 140, and so forth, which are used for operation of the system control unit 150, are expanded in the system memory 123. The system memory 123 also performs a function of accumulating acceleration output values in directions of three axes of the 3-axis acceleration sensor 130.

The power switch 125 switches between a power-on mode and a power-off mode for the camera main body 100 according to user operations.

The shutter button 126 is an operating unit for the user to give shooting operations to the camera main body 100.

When the user has pressed the shutter button 126 halfway down (shooting preparation instruction), the first shutter switch 127 is turned on and generates a first shutter switch signal SW1. In response to the first shutter switch signal SW1, the system control unit 150 starts a process such as an auto focusing process, an auto exposure process, an auto white balance process, or a pre flashing process.

When the user has pressed the shutter button 126 all the way down (shooting instruction), the second shatter switch 128 is turned on and generates a second shutter switch signal SW2. In response to the second shutter switch signal SW2, the system control unit 150 starts a series of shooting processes from reading of a signal from the image pickup device 105 to writing of the image data into a recording medium, not shown, via the recording circuit 107.

The 3-axis acceleration sensor 130 detects a posture change of the image pickup apparatus 1 as acceleration output values in the directions of the three axes (X axis, Y axis, Z axis in FIG. 3A, to be described later).

A ROM is used as the memory 140 in the first embodiment, but an electrically erasable and writable nonvolatile memory can be used as the memory 140. Constants, programs, and so forth, which are used for operation of the system control unit 150, are stored in the memory 140. The programs here mean those for executing various types of flowcharts in the present embodiment, which will be described later. The memory 140 also performs a function of storing model data on time-series changes in the acceleration output values in the directions of the three axes detected by the 3-axis acceleration sensor 130. Here, the model data includes at least two rinds of data. One is data showing time-series changes in the acceleration output values in the directions of the axes in a case where the user swings down the image pickup apparatus 1 at the end of use. The other one is data showing time-series changes in the acceleration output values in the directions of the axes in a case where the user swings down the image pickup apparatus 1 during use. It should be noted that "at the end of use" here means the time when the user has not used the image pickup apparatus 1 (for shooting, reproduction, live preview) for a predetermined time period or longer. On the other hand, "during use" means the time when the user continues using the image pickup apparatus 1.

The system control unit 150 is a control unit that has at least one processor and controls the overall operation of the camera main body 100.

The power supply control unit 160 is comprised of a battery detection circuit, a protective circuit, a DC-DC converter, an LDO regulator, and so forth. The power supply control unit 160 has a function of, when installation or removal of a battery, battery type, remaining battery, or overcurrent is detected, shutting off the power so as to protect a load circuit connected to the power supply control unit 160. Based on an instruction from the system control unit 150, the power supply control unit 160 controls the power supply unit 170 to supply a desired power supply voltage to each part of the camera main body 100 during a desired period.

The power supply unit 170 is comprised of a primary battery such as an alkali battery or lithium battery, a secondary battery such as a NiCd battery, a NiMH battery, or a Li battery, an AC adapter, and so forth.

The lens mount 102 is an interface for connecting the camera main body 100 to the lens unit 200.

The connector 101 electrically connects the camera main body 100 to the lens unit 200 and is controlled by the system control unit 150.

A description will now be given of an arrangement of lire lens unit 200.

The lens unit 200 has a connector 201, the lens mount 202, the diaphragm 203, the lens control unit 204, and the lens 205.

The lens control unit 204 controls the overall lens unit 200. The lens control unit 204 has a memory which stores constants, variables, programs, and so forth, which are used for operation. The lens control unit 204 also has a nonvolatile memory which holds identification information such as a number unique to the lens unit 200, management information, an aperture opening value and minimum aperture value of the diaphragm 203, function information such as a focal distance, various present and past setting values, and so forth. According to a focusing state of an image measured by the image processing unit 106, the lens control unit 204 is capable of performing auto-focusing by controlling focusing of the lens 205 and changing a position at which an optical image of a subject incident on the image pickup device 105 is formed. The lens control unit 204 is also equipped with a function of controlling the diaphragm 203 and controlling zooming of the lens 205.

The lens mount 202 is an interface for connecting the lens unit 200 to the camera main body 100.

The connector 201 electrically connects the lens unit 200 to the camera main body 100 and is controlled by the lens control unit 204.

Next, referring to FIG. 2A, a description will be given of a general outline of a power supply control process according to the first embodiment.

FIG. 2A is a block diagram showing in detail arrangements of the system control unit 150, the system memory 123, and the memory 140.

The system control unit 150 has a computation unit 151, a control unit 152, and a determination unit 153.

The system memory 123 has an accumulation area 141 comprised of a limited buffer or the like.

The memory 140 has a storage area 142 (second storage unit) where model data on time-series changes in acceleration output values in the directions of the three axes, which are output from the 3-axis acceleration sensor 130 (hereafter referred to as "the 3-axis acceleration output values") at the end of use of the image pickup apparatus 1 by the user, and a rule base conforming to the model data are stored. The model data and the rule base are referred to by the determination unit 153 when it performs signal pattern matching, to be described later.

The computation unit 151 computes the square root of the sum of the squares of the 3-axis acceleration output values output from the 3-axis acceleration sensor 130 and outputs it to the control unit 152.

The control unit 152 performs control to accumulate the 3-axis acceleration output values, which are output from the 3-axis acceleration sensor 130, in the accumulation area 141 (first storage unit) of the system memory 123 in time series. It should be noted that this control is performed only in a case where the square root of the sum of the squares of the acceleration output values output from the computation unit 151 chances in time series such that it falls and then rises as shown in FIG. 3C as will be described later.

The determination unit 153 performs pattern matching of time-series changes in the 3-axis acceleration output values output from the 3-axis acceleration sensor 130, which are accumulated in the accumulation area 141, and the model data stored in the storage area 142, based on the rule base stored in the storage area 142. According to a result of this pattern matching, the determination unit 153 classifies the time-series changes in the 3-axis acceleration output values accumulated in the accumulation area 141 into the end of use and during use. When the result of the classification is the end of use, the determination unit 153 outputs a control signal for switching to a power saving mode to the power supply control unit 160, causing the power supply control unit 160 to bring the camera main body 100 into the power saving mode. Here, the power saving mode means a mode in which the power supply control unit 160 controls the power supply unit 170 to stop supplying the power to a part of the camera main body 100.

Figure 2B:
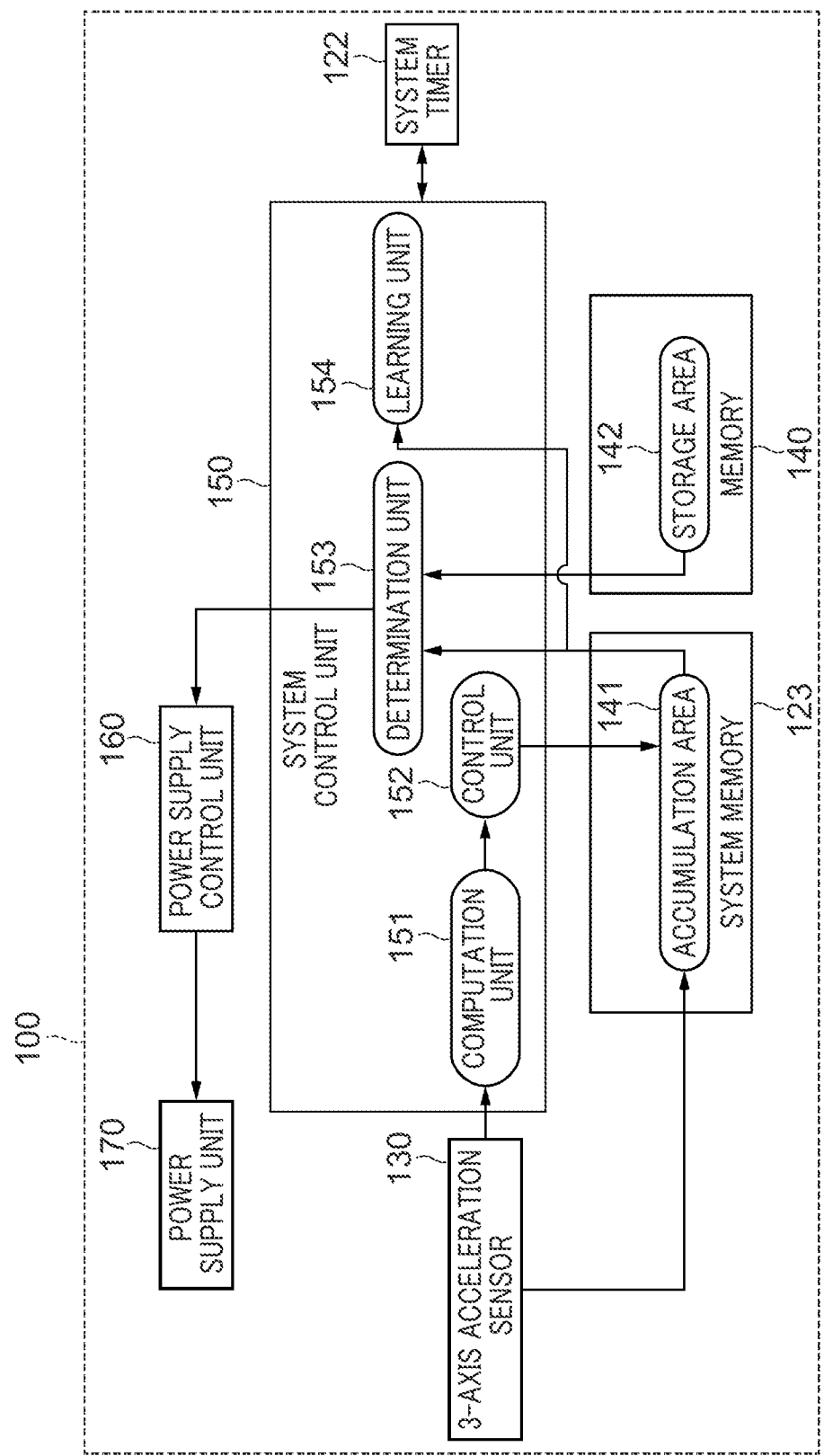
FIG. 2B is a block diagram showing an arrangement of a variation of FIG. 2A.

The system control unit 150 may also have a learning unit 154 as shown in FIG. 2B. However, even if the system control unit 150 does not have the learning unit 154, it is possible to carry out the power supply control process according to the first embodiment.

After performing the classification using the pattern matching described above, the determination unit 153 determines whether the result is correct or incorrect. The learning unit 154 performs additional learning (learning phase) using the time-series changes in the 3-axis acceleration output values accumulated in the accumulation area 142 as data on a correct classification result according to the result of the determination as to the classification result is correct or incorrect. Learned parameters in the learning model updated by this additional learning are stored in the storage area 142. It should be noted that determination as to whether the result is correct or incorrect is made based on whether or not there has been a button/touch operation by the user within a predetermined time period since the classification. The learning model constructed by the learning unit 154 will be described later with reference to FIG. 5.

Next, referring to FIGS. 3A, 3B, and 3C, a description will be given of the 3-axis acceleration output values from the 3-axis acceleration sensor 130 and the values calculated by the computation unit 151.

Figure 3A:
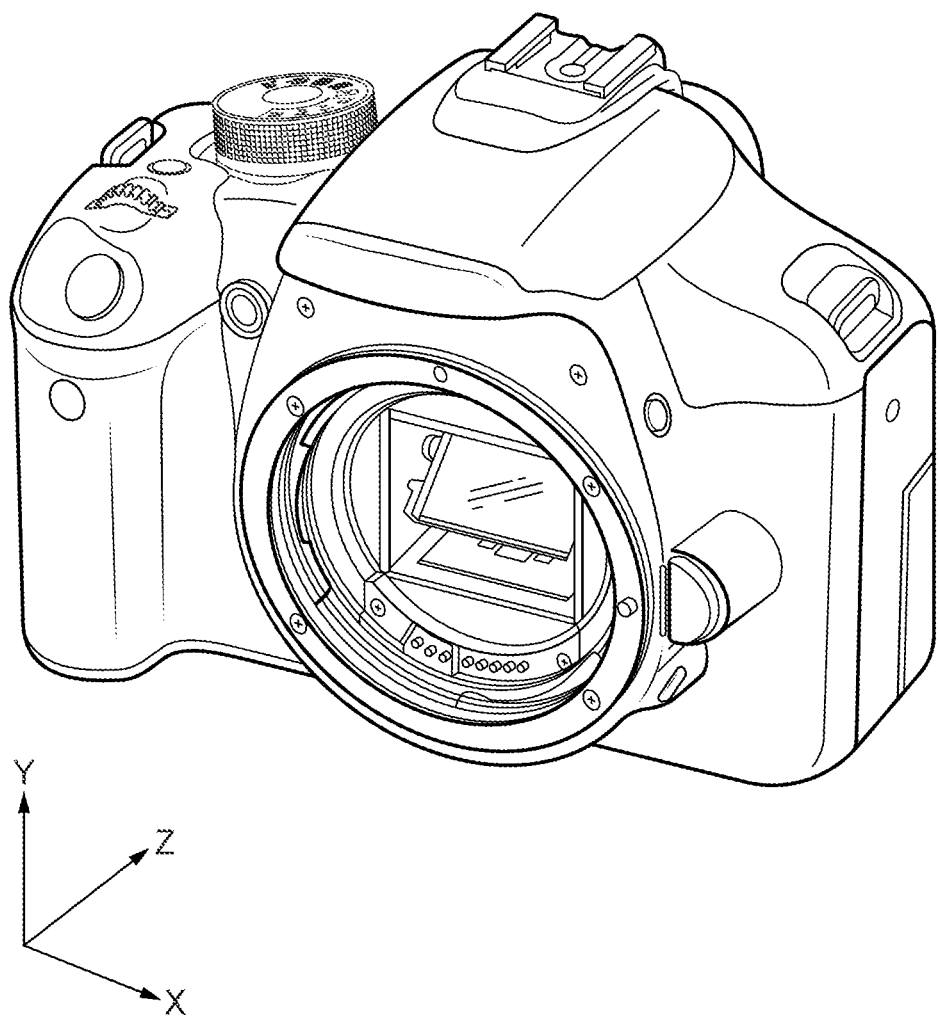
FIG. 3A is a view showing X, Y, and Z axes of a 3-axis acceleration sensor in FIG. 1.

FIG. 3A is a view showing the X axis, Y axis, and Z axis of the 3-axis acceleration sensor 130.

Figure 3B:
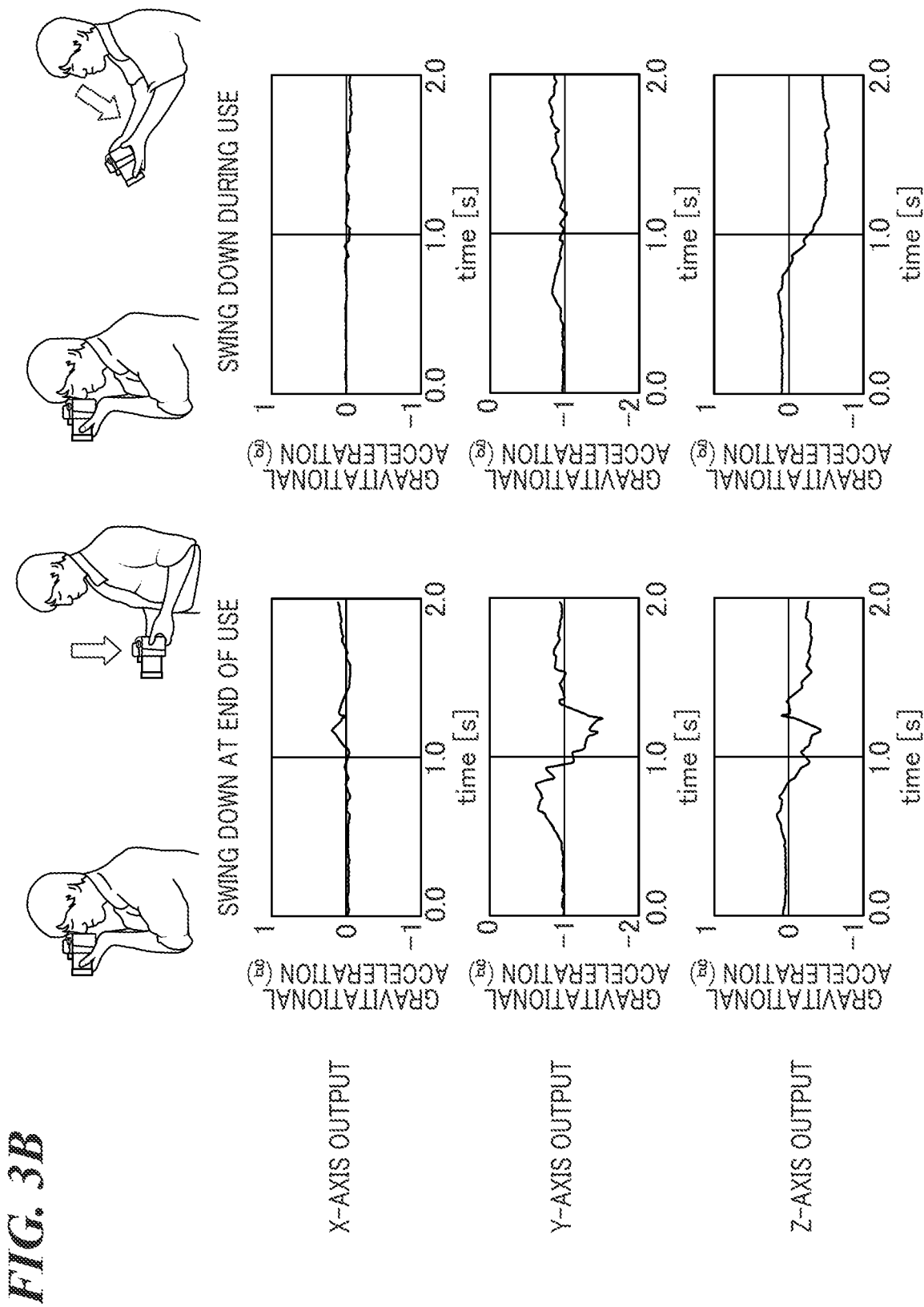
FIG. 3B is a view showing examples of how acceleration output values change with time in directions of the X axis, Y axis, and Z axis of the 3-axis acceleration sensor when a user swings down the image pickup apparatus at the end of use and during use.
Figure 3C:
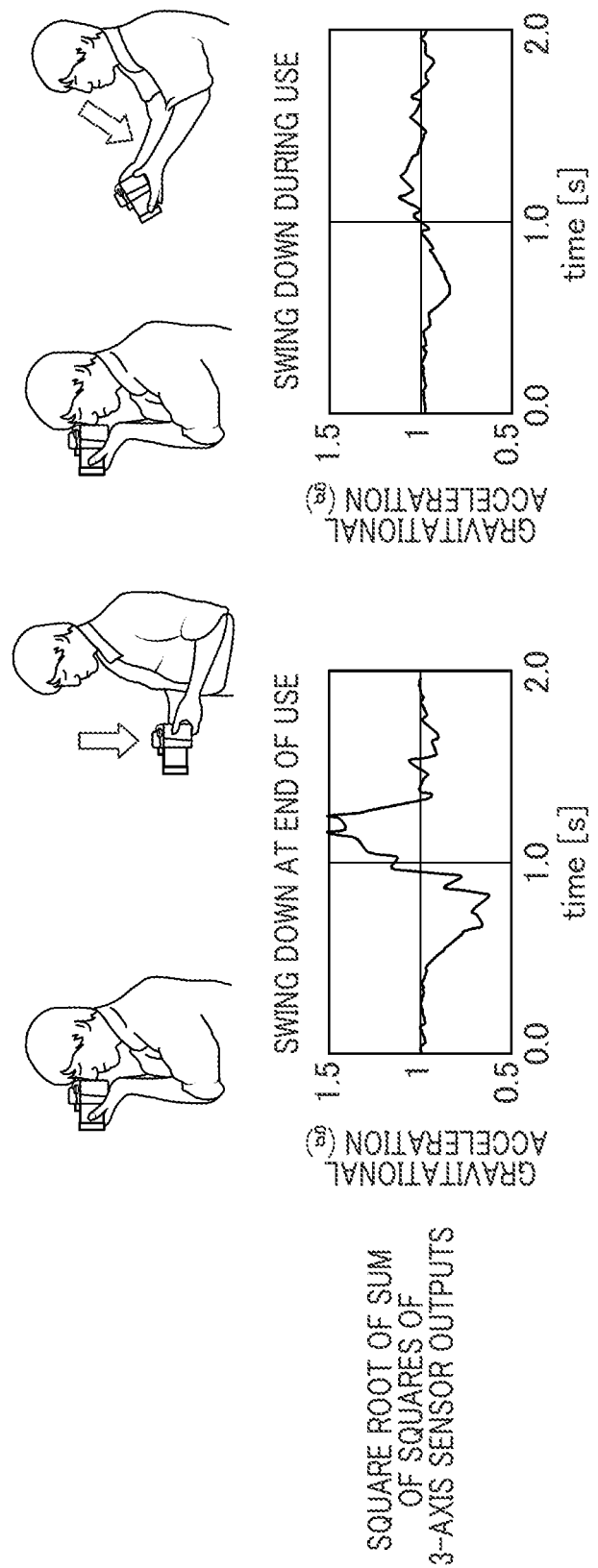
FIG. 3C is a view showing time-series changes in the square root of the sum of the squares of acceleration output values in the directions of the X axis, Y axis, and Z axis of the 3-axis acceleration sensor, which are shown in FIG. 3B.

FIG. 3B is a view showing examples of time-series changes in the acceleration output values in the directions of the X axis, Y axis, and Z axis of the 3-axis acceleration sensor 130 when the user swings down the image pickup apparatus 1 at the end of use and during use.

Referring to FIG. 3B, the vertical axis indicates the acceleration output values in the directions of the X axis, Y axis, and Z axis of the 3-axis acceleration sensor 130, and the horizontal axis indicates times at which the 3-axis acceleration sensor 130 detects the acceleration.

As shown in FIG. 3B, at the end of use, the user swings down the image pickup apparatus 1 without fixing it, and hence the acceleration changes not only in the direction of the Y axis along which the image pickup apparatus 1 is swung down but also in the directions of the X axis and the Z axis. On the other hand, during use, the user swings down the image pickup apparatus 1 while fixing it, and hence the acceleration hardly changes in the directions of the axes, particularly the direction of the X axis, other than the Y axis along which the image pickup apparatus 1 is swung down. Thus, in the first embodiment, the pattern matching is performed using differences among combinations of changes in the acceleration in the directions of the three axes as feature points.

FIG. 3C is a view showing time-series changes in the square root of the sum of the squares of acceleration output values in the directions of the X axis. Y axis, and Z axis of the 3-axis acceleration sensor 130, which are show in in FIG. 3B. As described above, values of the square root of the sum of the squares are computed by the computation unit 151.

Referring to FIG. 3C, the vertical axis indicates values of the square root of the sum of the squares, and the horizontal axis indicates times at which the 3-axis acceleration sensor 130 detects the acceleration.

As shown in FIG. 3B, when the image pickup apparatus 1 is standing still, the acceleration output values in the directions of the X axis and Z axis of the 3-axis acceleration sensor 130 are zero, while the acceleration output value in the Y axis is −1. Thus, in FIG. 3C, a case where the value of the square root of the sum of the squares computed from the acceleration output values in the directions of the X axis, Y axis, and Z axis of the 3-axis acceleration sensor 130 is 1 corresponds to a state where only the acceleration of gravity is applied to the image pickup apparatus 1, that is, a state where the image pickup apparatus 1 is standing still. Therefore, it is assumed that a reference value for the square root of the sum of the squares to be computed is 1. As shown in FIG. 3C, when the user swings down the image pickup apparatus 1, the value of the square root of the sum of squares becomes smaller than the reference value and then increases. When the user has finished swinging down the image pickup apparatus 1, the value of the square root of the sum of the squares becomes equal to the reference value again. By detecting such characteristic changes, the control unit 152 determines whether or not the image pickup apparatus 1 has been swung down.

A description will now be given of the power supply control process according to the first embodiment with reference to flowcharts of FIGS. 4A and 4B.

It should be noted that the power supply control process is implemented by the system control unit 150 reading out a program from the memory 140 and expanding it on the system memory 123.

In step S400, when the user turns on the power switch 125, the system control unit 150 starts the camera main body 100.

In step S401, the system control unit 150 starts the 3-axis acceleration sensor 130 and starts obtaining the 3-axis acceleration output values from the 3-axis acceleration sensor 130 at a predetermined sampling rate.

In step S402, the computation unit 151 starts computing the square root of the sum of the squares of the 3-axis acceleration output values from the 3-axis acceleration sensor 130. Specifically, each time the 3-axis acceleration output values are obtained at the predetermined sampling rate, the computation unit 151 starts computing the square root of the sum of the squares of the 3-axis acceleration output values, associates the computed square root of the sum of the squares with a time at which they were detected, and outputs a computation result to the control unit 152. The control unit 152 also starts accumulating computation results from the computation unit 151.

Based on the computation result, the control unit 152 makes determinations in steps S403, S405, and S409, to be described later, in which it determines whether or not the user has swung down the image pickup apparatus 1. Specifically, in a case where time-series changes in the square root of the sum of the squares computed in the step S402 are those shown in FIG. 3C, the computation unit 151 determines that the user has swung down the image pickup apparatus 1.

Namely, first, in the step S403, the control unit 152 detects a falling motion (first motion) occurring in the first half of a swinging-down motion by providing the computation result in the step S402 with a threshold value. When the control unit 152 detects the falling motion, it causes the system timer 122 to start measuring time, followed by the process proceeding to step S404. On the other hand, when the control unit 152 does not detect the falling motion, the step S403 is repeated.

In the step S404, the control unit 152 starts accumulating the 3-axis acceleration output values, which are detected by the 3-axis acceleration sensor 130, in the accumulation area 141 of the system memory 123 in association with the times at which the 3-axis acceleration sensor 130 detect them.

In the step S405, the control unit 152 detects a rising motion occurring in the second half of the swinging-down motion. Specifically, the detection is implemented by providing the computation results associated with detection times later than the time at which the falling motion is detected with another threshold value. When the rising motion is detected, the process proceeds to step S406. On the other hand, when the rising motion is not detected, the process proceeds to step S407.

In the step S406, the control unit 152 continues to accumulate the 3-axis acceleration output values detected by the 3-axis acceleration sensor 130 in the accumulation area 141 of the system memory 123.

In the step S407, the control unit 152 checks the amount of elapsed time measured by the system timer 122 and judges whether or not a predetermined time period has elapsed since the falling action was detected in the step S403. When it is judged that predetermined time period has elapsed, the process proceeds to step S408. On the other hand, when it is judged that the predetermined time period has not elapsed, the step S405 is repeated.

In the step S408, the control unit 152 deletes the 3-axis acceleration output values detected by the 3-axis acceleration sensor 130 and accumulated in the accumulation area 141 of the system memory 123. The control unit 152 also deletes the computation results provided by the computation unit 151, which the control unit 152 started to accumulate in the step S402.

In the step S409, the control unit 152 detects a standing-still state of the image pickup apparatus 1 at the end of the swinging-down motion based on whether or not any of computation results computed in the step S402 and associated with detection times later than the time at which the rising motion was detected has become equal to the reference value. When the control unit 152 detects the standing-still state of the image pickup apparatus 1, it is determined that there has been a motion (second motion) where the computation result has become the reference value at the end of the swinging-down motion after the falling action in the second-half of the swinging-down motion, the process proceeds to step S410. When the control unit 152 does not detect the standing-still state of the image pickup apparatus 1, the step S409 is repeated.

In the step S410, the control unit 152 ends the accumulation of the 3-axis acceleration output values output from the 3-axis acceleration sensor 130 in the accumulation area 141 of the system memory 123. The control unit 152 also deletes the computation results provided by the computation unit 151, which the control unit 152 started accumulating in the step S402.

In step S411, the determination unit 153 obtains data comprised of the 3-axis acceleration output values accumulated in the accumulation area 141 of the system memory 123 and the times of detection by the 3-axis acceleration sensor 130 (time-series changes in the accumulated 3-axis acceleration output values) as input data.

In step S412, the determination unit 153 obtains the model data stored in the storage area 142 of the memory 140.

In step S413, first, based on the rule base, the determination unit 153 performs pattern matching to determine which model data is similar to the input data obtained in the step S411. The input data is classified into the end of use and during use through the pattern matching. For example, as a result of the pattern matching, when it is judged that the input data is similar to model data in which the acceleration changes in each of the directions of all the axes, the input data is classified into the end of use.

In step S414, the determination unit 153 judges whether or not the input data has been classified into the end of use as a result of the pattern matching in the step S413. When it is judged that the input data is classified into the end of use, the process proceeds to step S415. On the other hand, it is judged that the input data has not been classified into the end of use, the process proceeds to step S417.

In the step S415, the 3-axis acceleration output values accumulated in the accumulation area 141 of the system memory 123 are deleted.

In step S416, the control unit 152 for the system memory 123 transmits a control signal indicating switch to the power saving mode to the power supply control unit 160, causing the power supply control unit 160 to control the power supply unit 170 and bring the camera main body 100 to the power saving mode. After that, the control unit 152 ends the present process.

In the step S417, the 3-axis acceleration output values accumulated in the accumulation area 141 of the system memory 123 are deleted, and the present process is ended.

As described above, in the first embodiment, whether the user swung down the image pickup apparatus 1 at the end of use or during use is made based on a result of the rule-based pattern matching of input data. As a result, when it is determined that the user swung down the image pickup apparatus 1 at the end of use, the camera main body 100 is switched to the power saving mode. This improves power saving efficiency of the image pickup apparatus 1 and also prevents the camera main body 100 from going into the power saving mode by mistake during use.

Moreover, in the case where the camera main body 100 has the arrangement shown in FIG. 2B, if the above described additional learning using the learning unit 154 is continued, the accuracy with which the input data is classified into the end of use or during use becomes higher in the case where the learning model is used than in the case where the pattern matching is used. At this point, the determination unit 153 classifies the input data into the end of use or during use using the learning model constructed by the teaming unit 154 instead of carrying out the processes in the steps S412 and S413 in FIG. 4. Thus, as the length of time that user uses the image pickup apparatus 1 increases, the power saving efficiency of the image pickup apparatus 1 is further improved, and also the camera main body 100 is reliably prevented from going into the power saving mode by mistake during use.

A description will now be given of a second embodiment of the present invention.

In the first embodiment, the determination unit 153 determines whether the user swung down the image pickup apparatus 1 at the end of use or during use based on a result of the rule-based pattern matching on the input data. On the other hand, in the second embodiment, the determination unit 153 makes this determination based on an output result from a learning model 503 in FIG. 5, to be described later, constructed by the learning unit 154 in FIG. 2B.

A hardware arrangement according to the second embodiment is the same as the one according to the first embodiment. Thus, features of the second embodiment that are the same as those of the first embodiment are described by denoting them using the same reference numerals, only features different from those of the first embodiment being described below.

FIG. 5 is a view useful in explaining data input to and output from the learning model 503 constructed by the learning unit 154 according to the second embodiment.

As described above with reference to FIG. 2B, the learning model 503 is a learning model constructed by the learning model 154 in the learning phase. In an inference phase, the determination unit 153 using the constructed learning model outputs output data 502 in response to input of input data 501.

Figure 4A:
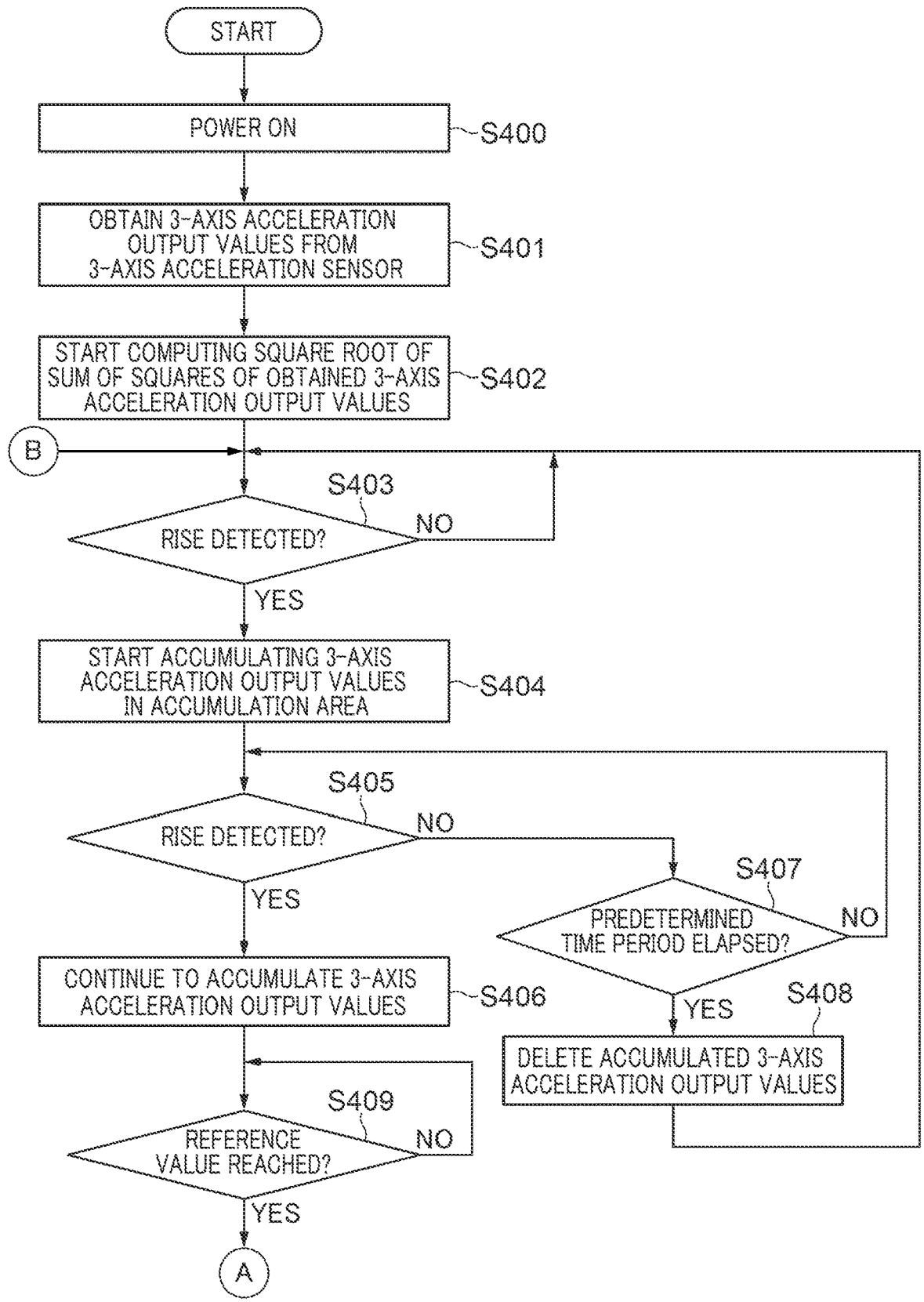
FIGS. 4A and 4B are flowcharts of a power supply control process according to the first embodiment.
Figure 4B:
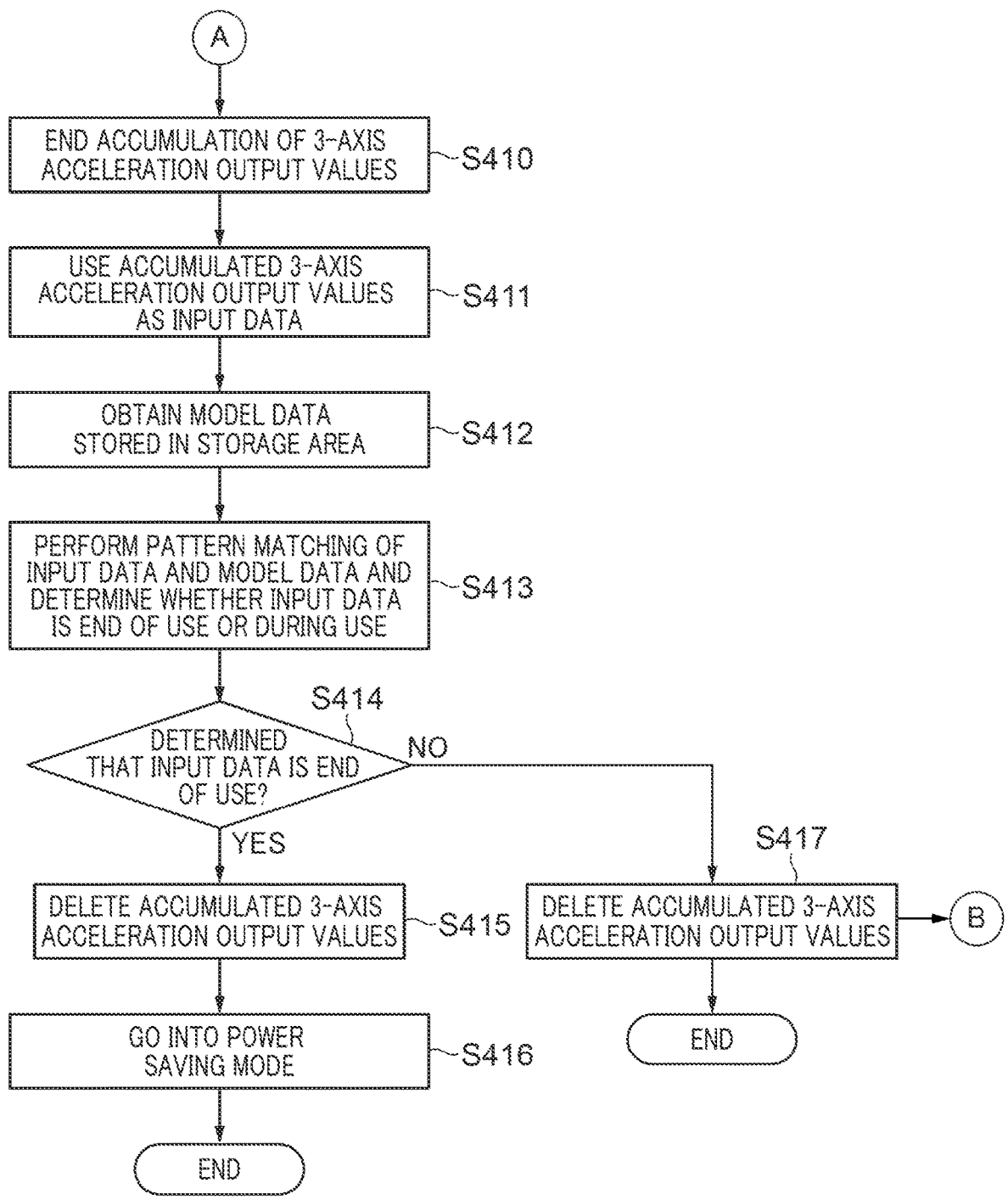

The input data 501 is data on the 3-axis acceleration output values from the 3-axis acceleration sensor 130 accumulated in the accumulation area 141 of the system memory 123 in a process from the step S404 in FIG. 4A to the step S410 in FIG. 4B.

The output data 502 is data indicating whether the input data 501 has been classified into the end of use or during use as a result of inference by the leaning model 503. As described above with reference to FIG. 3B, the user swings down the image pickup apparatus 1 at the end of use without fixing it, the acceleration changes in the directions of the X axis and the Z axis as well as the direction of the Y axis that is the swinging-down direction. On the other hand, during use, the user swings down the image pickup apparatus 1 while fixing it, and the acceleration hardly changes in the directions of the axes, particularly the direction of the X axis, other than the Y axis that is the swinging-down direction. Therefore, in the learning phase, the leaning model 503 is constructed by using differences between the combinations of acceleration changes in the directions of the three axes as feature points.

The learning model 503 is constructed in advance by the learning unit 154 through deep learning using a neural network. Here, for example, training data, which is obtained by adding a label (for example, a value of 1) indicating the end of use to input data comprised of the 3-axis acceleration output values from the 3-axis acceleration sensor 130 in a case where the acceleration changes in the directions of the X and Z axes as well as the direction of the Y axis that is the swinging-down direction, is used for learning in advance. Further, training data, which is obtained by adding a label (for example, a value of 0) indicating during use to input data comprised of the 3-axis acceleration output values from the 3-axis acceleration sensor 130 in a case where the acceleration hardly changes in the directions of the axes, particularly the direction of the X axis, other than the direction of the Y axis that is the swinging-down direction, is used for learning in advance. It should be noted that the learning model 503 has only to be constructed through machine learning, and an algorithm for it is not particularly limited. For example, the nearest neighbor algorithm, Naive Bayes algorithm, decision tree algorithm, support-vector machine algorithm, or the like may be used as the algorithm for the leaning model 503.

The leaning unit 154 also has an error detection unit and an update unit, which are not shown in FIG. 2B.

The error detection unit detects an error between the output data 502, which is output from an output layer of the leaning model 503 in response to the input data 501 input to an input layer of the learning model 503, and the training data. It should be noted that the error detection unit may use a loss function in calculating an error between the output data 502 from the leaning model 503 and the training data.

Based on the error obtained by the error detecting unit, the update unit updates the learned parameters such as a weighting factor for connecting nodes of the neural network constituting the learning model 503 (hereafter referred to merely as "updates the learning model 503"). The update unit updates the learned parameters in the learning model 503 using, for example, the back-propagation method. According to the back-propagation method, the learned parameters in the learning model 503 are adjusted so as to reduce the error mentioned above.

A description will now be given of a power supply control process according to the second embodiment with reference to a schematic diagram of FIG. 6 and flowcharts of FIGS. 7A and 7B. In this power supply control process, whether the user swung down the image pickup apparatus 1 at the end of use or during use is determined based on an output result from the learning model 503, and according to a result of the determination, the camera main body 100 is switched to the saving mode. Furthermore, in this power supply control process, whether the classification result described above is correct or incorrect is determined based on whether or not there has been a user operation within a predetermined time period since the classification. As a result of the determination, when the classification result is incorrect, the error detection unit of the learning unit 154 detects whether there is an error, when there is an error, the update unit of the learning unit 154 updates the learning model 503 based on the error.

It should be noted that the power supply control process is implemented by the system control unit 150 reading out a program from the memory 140 and expanding it on the system memory 123.

First, the processes in the sups S400 through S410 are carried out. As a result, time-series changes in the 3-axis acceleration output values detected by the 3-axis acceleration sensor 130 from the start to end of swinging-down of the image pickup apparatus 1 by the user are accumulated in the accumulation area 141 of the system memory 123 ((1) to (4) in FIG. 6), and then the process proceeds to step S700.

Figure 6:
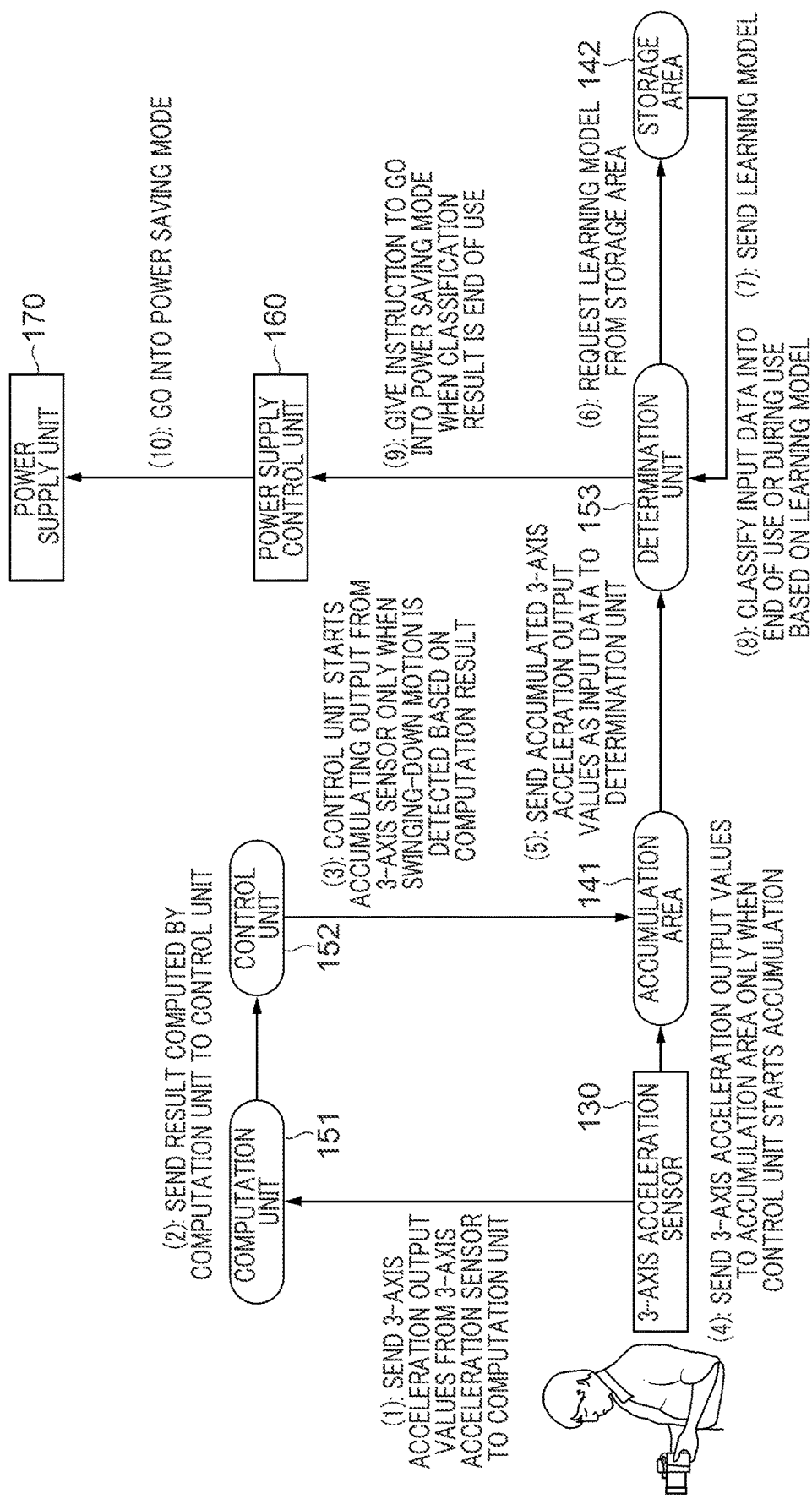
FIG. 6 is a schematic diagram showing a general outline of a power supply control process according to the second embodiment.
Figure 7A:
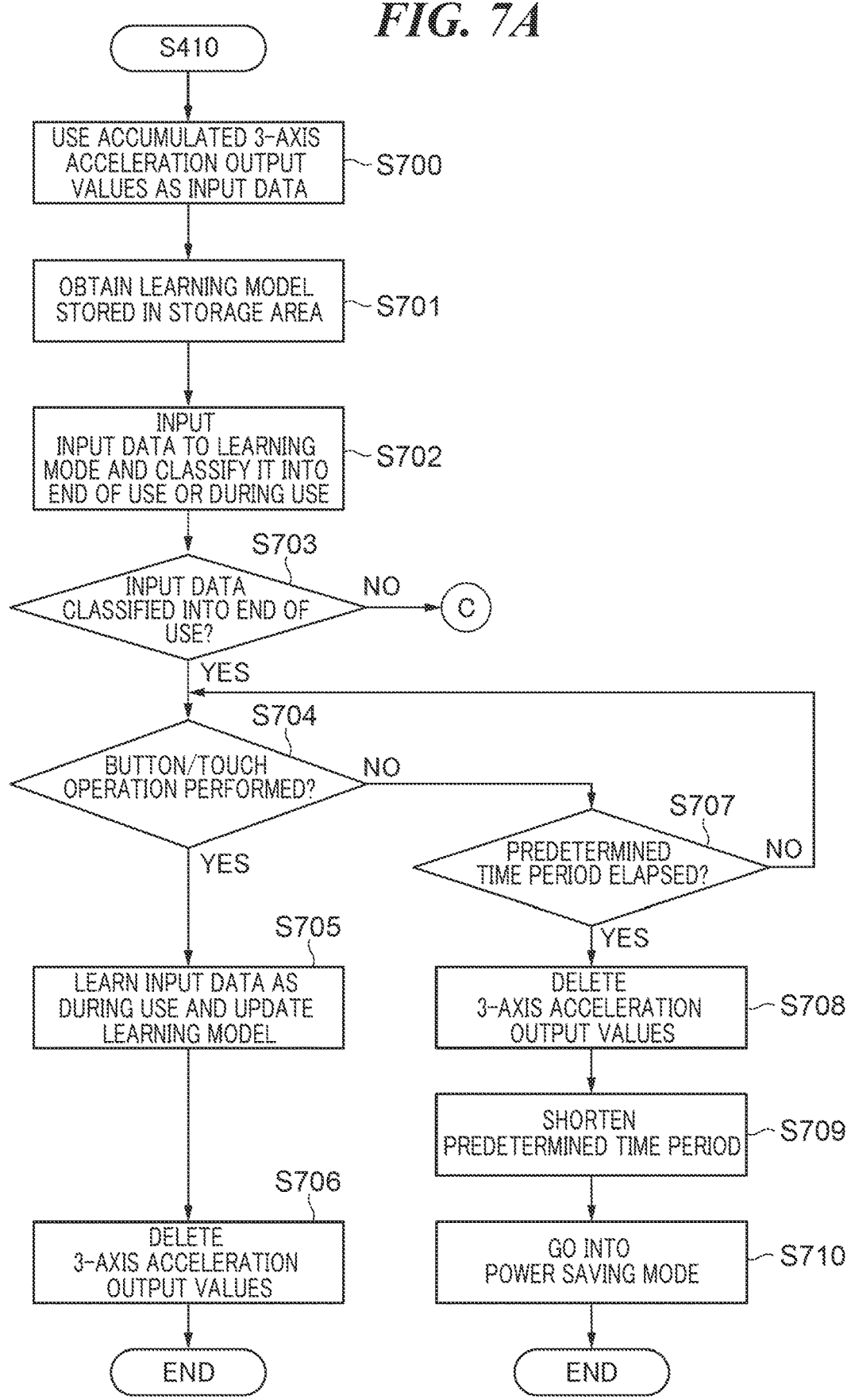
FIGS. 7A and 7B are flowcharts of a power supply control process according to the second embodiment.
Figure 7B:
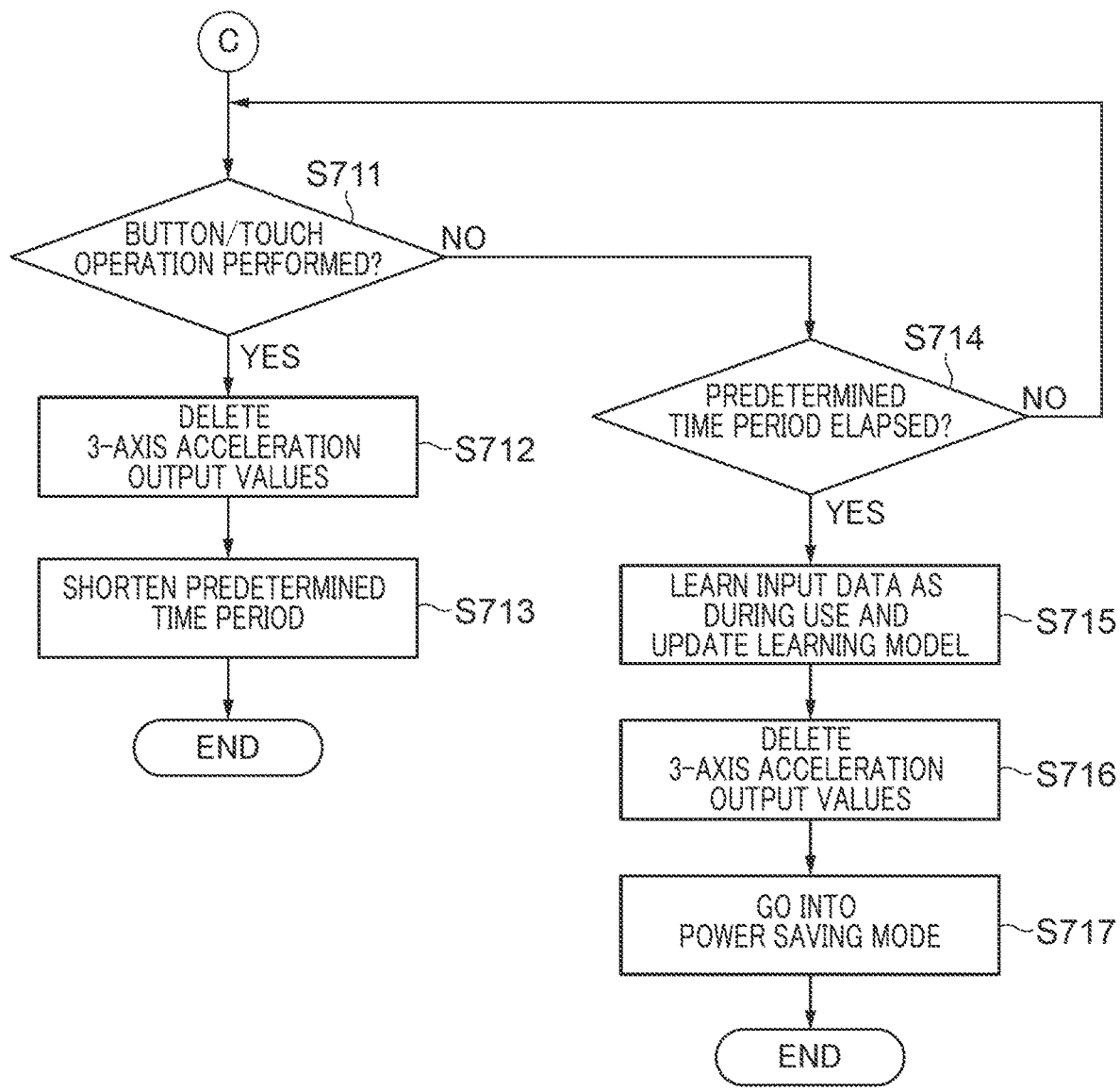

In the step S700, the determination unit 153 obtains the 3-axis acceleration output values accumulated in the accumulation area 141 of the system memory 123 as the input data 501 ((5) in FIG. 6).

In step S701, the determination unit 153 obtains the learning model 503 stored in the storage area 142 of the system memory 123.

In step S702, the determination unit 153 inputs the input data 501 to the learning model 503 and obtains the output data 502.

In step S703, the determination unit 153 judges whether or not the output data 502 obtained in the step S702 has been classified into the end of use. When it is judged here that the output data 502 has been classified into tire end of use, the system timer 122 is caused to start measuring time, and also the process proceeds to step S704. On the other hand, when it is judged that the output data 502 is not classified the end of use, that is, the output data 502 has been classified into during use, the system timer 122 is caused to start measuring time, and also the process proceeds to step S711.

In the step S704, based on a signal from the operating unit 124, the determination unit 153 judges whether or not there has been a button/touch operation by the user. When it is judged here that there has been the button/touch operation, the process proceeds to step S705. The case where there has been the button/touch operation specifically means during use, not the end of use. Namely, the output result from the present learning model 503 is incorrect. Thus, the process proceeds to the step S705, in which re-learning (additional learning) is performed.

In the step S705, the error detection unit of the learning unit 154 obtains an error between the output data 502 output from the output layer of the learning model 503 and the training data to which the label indicating during use is attached. Then, the update unit of the learning unit 154 performs additional learning based on the obtained error and updates the learning model 503.

In step S706, the 3-axis acceleration output values from the 3-axis acceleration sensor 130 accumulated in the accumulation area 141 of the system memory 123 are deleted, and the present process is ended.

On the other hand, when it is judged that there has not been the button/touch operation (NO in the step S704), the process proceeds to step S707. The case where it is judged that there has not been the button/touch operation specifically means the end of use. Namely, the output result from the present learning model 503 is correct.

In the step S707, the determination unit 153 checks the time measured by the system timer 122 and judges whether or not a predetermined time period has elapsed since it is judged in the step S703 that the output data 502 had been classified into the end of use. When it is judged here that the predetermined time period has elapsed, the process proceeds to step S708. On the other hand, when it is judged that the predetermined time period has not elapsed, the step S704 is repeated. Namely, in the case where the output data 502 was classified into the end of use (that is, YES in the step S703), and there has been no button/touch operation by the user within the predetermined time period (NO in the step S707, YES in the step S704), the process proceeds to the step S705.

In the step S708, the 3-axis acceleration output values from the 3-axis acceleration sensor 130 accumulated in the accumulation area 141 of the system memory 123 are deleted. On this occasion, the same process as the one in the step S705 may be carried out. Namely, the error detection unit of the learning unit 154 detects an error between the output data 502 output from the output layer of the learning model 503 and the training data to which the label indicating the end of use is attached. Then, the update unit of the learning unit 154 performs additional learning based on the detected error and updates the learning model 503. Namely, in this case, re-learning using the training data to which the label indicating the end of use is attached is performed on input data which could be correctly determined as the end of use by the present learning model 503.

In step S709, the amount of time set as the predetermined time period for use in the judgment in the steps S704 and S707 as to whether or not there has been the button/touch operation is shortened.

In step S710, the control unit 152 of the system memory 123 transmits a control signal indicating switch to the power saving mode to the power supply control unit 160, causing the power supply control unit 160 to control the power supply unit 170, which in turn switches the camera main body 100 to the power saving mode ((9), (10) in FIG. 6). Then, the present process is ended.

In step S711, based on a signal from the operating unit 124, the determination unit 153 judges whether or not there has been a button/touch operation by the user. When it is judged here that there has been the button/touch operation, the process proceeds to step S712. The case where there has been the button/touch operation specifically means during use, not the end of use. Namely, the output result from the present learning model 503 is correct. On the other hand, when it is judged here that there has not been the button/touch operation (NO in the step S711), the process proceeds to step S714. The case where there has not been the button/touch operation specifically means the end of use. Namely, the output result from the present learning model 503 is incorrect. Thus, the process proceeds to the step S714, in which re-learning (additional learning) is performed.

In the step S712, the 3-axis acceleration output values from the 3-axis acceleration sensor 130 accumulated in the accumulation area 141 of the system memory 123 are deleted. On this occasion, the same process as the one in step S715, to be described later, may be carried out. Namely, the error detection unit of the learning unit 154 detects an error between the output data 502 output from the output layer of the learning model 503 and the training data to which the label indicating during use is attached. Then, the update unit of the learning unit 154 performs additional learning based on the detected error and updates the learning model 503. Namely, in this case, re-learning using the training data to which the label indicating during use is attached is performed on input data which could be correctly determined as the one during use by the present learning model 503.

In step S713, the amount of time set as the predetermined time period for use in the judgment in the step S711 and step S714, to be described below, as to whether or not there has been the button/touch operation is shortened.

In the step S714, the determination unit 153 checks the time measured by the system timer 122 and judges whether or not a predetermined time period has elapsed since it determined in the step S703 that the output data 502 had not been classified into the end of use. When it is judged that the predetermined time period has elapsed, the process proceeds to the step S715. On the other hand, when it is judged that the predetermined time period has not elapsed, the step S711 is repeated. Namely, in the case where input data was not classified into the end of use (i.e. classified into during use) (NO in the step S703), and there has been no button/touch operation by the user within the predetermined time period (YES in the step S711, YES in the step S714), the process proceeds to the step S715. The case where there has been no button/touch operation specifically means the end of use. Namely, the output result from the present learning model 503 is incorrect. Thus, the process proceeds to the step S715, in which re-learning (additional learning) is performed.

In the step S715, the error detection unit of the learning unit 154 detects an error between the output data 502 output from the output layer of the learning model 503 and the training data to which the label indicating the end of use is attached. Then, the update unit of the learning unit 154 performs additional learning based on the detected error and updates the learning model 503.

In step S716, the 3-axis acceleration output values from the 3-axis acceleration sensor 130 accumulated in the accumulation area 141 of the system memory 123 are deleted.

In step S717, the control unit 152 of the system memory 123 transmits a control signal indicating switch to the power saving mode to the power supply control unit 160, causing the power supply control unit 160 to control the power supply unit 170, which in turn switches the camera main body 100 to the power saving mode. Then, the present process is ended.

Only when the learning model 503 has output a correct classification result as the output data 502, the amount of time set as the predetermined time period for use in judging whether or not there has been the button/touch operation by the user can be shortened in the steps S709 and S713. Namely, as the accuracy of the patient matching by the learning model 503 increases, the image pickup apparatus 1 is able to quickly switch to the power saving mode after detecting that the user swung it down at the end of use.

As described above, in the second embodiment, whether the user swung down the image pickup apparatus 1 at the end of use or during use is judged using the learning model 503, and when it is judged that the user swung down the image pickup apparatus 1 at the end of use, the image pickup apparatus 1 switches to the power saving mode. This improver the power saving efficiency of the image pickup apparatus 1 and also prevents it from going into the power saving mode by mistake during use.

Furthermore, the additional learning using the learning unit 154 makes it possible to perform classification according to habits of individual users as well, and hence as the image pickup apparatus 1 is used, its classification accuracy increases, making it possible for the image pickup apparatus 1 to quickly switch to the power saving mode without incorrect classification.

It should be noted that although the image pickup apparatus 1 is taken as an example in the above description of the present embodiment, the present invention is not limited to this. The present invention can be applied to any terminal apparatuses as long as they are capable of being swung down by user's hands.

Although the present invention has been described by way of the preferred embodiments, the present invention should not be limited to the embodiments described above, but various modifications and alterations can be made without departing from the spirit of the prevent invention.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiments), and by a method performed by the computer of the system or apparatus by, for example, reading out and executing the computer executable instructions from the storage medium to perform the functions of one or more of the above-described embodiment(s) and or controlling the one or more circuits to perform the functions of one or more of the above-described embodiments). The computer may comprise one or more processors (e.g., central processing unit (CPU), micro processing unit (MPU)) and may include a network of separate compilers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-230046, filed Dec. 20, 2039, which is hereby incorporated by reference herein in its entirety.

What is claimed is:

1. A terminal apparatus having a motion of being swung down by user's hands, comprising:
a motion detection unit configured to detect motions in directions of three axes of the terminal apparatus and output acceleration output values in the directions of the three axes as the detected motions;
a determination unit configured to, based on the acceleration output values from the motion detection unit, determine whether the terminal apparatus was swung down at the end of use of the terminal apparatus or during use of the terminal apparatus; and
a power saving unit configured to, in a case where it is determined that the terminal apparatus was swung down at the end of use of the terminal apparatus, switch the terminal apparatus to a power saving mode, and in a case where it is determined that the terminal apparatus was swung down during use of the terminal apparatus, prevent the terminal apparatus from switching to the power saving mode.

2. The terminal apparatus according to claim 1, comprising:
a computation unit configured to compute a square-root of a sum of squares of the acceleration output values in the directions of the three axes;
a control unit configured to, when a computation result indicating a first motion is output from the computation unit, control a first storage unit such that accumulation of the acceleration output values in the directions of the three axes is started, and after that, when a computation result indicating a second motion is output from the computation unit, control the first storage unit such that accumulation of the acceleration output values in the directions of the three axes is ended; and
an obtaining unit configured to obtain, from a second storage unit, first model data that represents time-series changes in the acceleration output values in the directions of the three axes in the case where the terminal apparatus was swung down at the end of use of the terminal apparatus, and second model data that represents time-series changes in the acceleration output values in the directions of the three axes in the case where the terminal apparatus was swung down during use of the terminal apparatus,
wherein, when the accumulation of the acceleration output values in the directions of the three axes in the first storage unit is ended under the control of the control unit, the determination unit performs pattern matching for determining which one of the first model data and the second model data is similar to time-series changes in the acceleration output values in the directions of the three axes accumulated in the first storage unit, and based on a result of the pattern matching, determines whether the terminal apparatus was swung down at the end of use of the terminal apparatus or during use of the terminal apparatus.

3. The terminal apparatus according to claim 2, wherein the pattern matching is rule-based pattern matching.

4. The terminal apparatus according to claim 2, further comprising:
a learning unit configured to, when the accumulation of the acceleration output values in the directions of the three axes in the first storage unit is ended under the control of the control unit, construct a learning model that uses the acceleration output values in the directions of the three axes accumulated in the first storage unit as input data and outputs a result indicating the end of use of the terminal apparatus or during use of the terminal apparatus in response to the input data,
wherein the learning unit comprises an update unit that, in a case where there has been no operation on the terminal apparatus within a predetermined time period since the pattern matching was performed, performs additional leaning learning so as to output a result indicating the end of use of the terminal apparatus in response to the input data and update the learning model.

5. The terminal apparatus according to claim 1, comprising:
a computation unit configured to compute a square-root of sum of squares of the acceleration output values in the directions of the three axes;
a control unit configured to, when a computation result indicating a first motion is output from the computation unit, control a first storage unit to start accumulation of the acceleration output values in the directions of the three axes, and after that, when a computation result indicating a second motion is output from the computation unit, control the first storage unit to end accumulation of the acceleration output values in the directions of the three axes; and
an obtaining unit configured to obtain, from a second storage unit, a learning model that outputs a result indicating the end of use of the terminal apparatus or during use of the terminal apparatus in response to input data,
wherein, when the accumulation of the acceleration output values in the directions of the three axes in the first storage unit is ended under the control of the control unit, the determination unit obtains time-series changes in the acceleration output values in the directions of the three axes accumulated in the first storage unit as the input data, and based on the output result from the learning model, determines whether the terminal apparatus was swung down at the end of use of the terminal apparatus or during use of the terminal apparatus.

6. The terminal apparatus according to claim 5, further comprising a learning unit configured to construct the learning model, wherein in a case where there has been no operation on the terminal apparatus within a predetermined time period since the determination was made by the determination unit, the learning unit performs additional learning so as to output a result indicating the end of use of the terminal apparatus in response to the input data and updates the learning model.

7. The terminal apparatus according to claim 6, wherein in the case where the determination unit determines that the terminal apparatus was swung down at the end of use of the terminal apparatus, and there has been no operation on the terminal apparatus within the predetermined time period, the amount of time used as the predetermined time period is shortened.

8. The terminal apparatus according to claim 6, wherein in the case where the determination unit determines that the terminal apparatus was swung down during use of the terminal apparatus, and there has been an operation on the terminal apparatus within the predetermined time period, the amount of time used as the predetermined time period is shortened.

9. A power supply control method for a terminal apparatus having a motion of being swung down by user's hands, comprising:

detecting motions in directions of three axes of the terminal apparatus and outputting acceleration output values in the directions of the three axes as the detected motions;

based on the acceleration output values, determining whether the terminal apparatus was swung down at the end of use of the terminal apparatus or during use of the terminal apparatus; and switching the terminal apparatus to a power saving mode in a case where it is determined that the terminal apparatus was swung down at the end of use of the terminal apparatus; and preventing the terminal apparatus from switching to the power saving mode in a case where it is determined that the terminal apparatus was swung down during use of the terminal apparatus.

10. A non-transitory computer-readable storage medium storing a program for causing a computer to execute a power supply control method for a terminal apparatus having a motion of being swung down by user's hands, wherein the power supply control method comprises:

detecting motions in directions of three axes of the terminal apparatus and outputting acceleration output values in the directions of the three axes as the detected motions;

based on the acceleration output values, determining whether the terminal apparatus was swung down at the end of use of the terminal apparatus or during use of the terminal apparatus; and switching the terminal apparatus to a power saving mode in a case where it is determined that the terminal apparatus was swung down at the end of use of the terminal apparatus; and preventing the terminal apparatus from switching to the power saving mode in a case where it is determined that the terminal apparatus was swung down during use of the terminal apparatus.

\* \* \* \* \*